(12) United States Patent
Fraleu et al.

(10) Patent No.: US 11,695,981 B2
(45) Date of Patent: Jul. 4, 2023

(54) ELECTRONIC PROGRAM GUIDE, METHOD FOR AN ELECTRONIC PROGRAM GUIDE, AND CORRESPONDING DEVICE

(71) Applicant: InterDigital Madison Patent Holdings, SAS, Paris (FR)

(72) Inventors: Sebastien Fraleu, Noyal sur Vilaine (FR); Thomas Morin, Rennes (FR); Goulven Querre, Noyal sur Vilaine (FR); Sebastien Bergot, Mouazé (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 17/299,204

(22) PCT Filed: Nov. 28, 2019

(86) PCT No.: PCT/EP2019/083000
§ 371 (c)(1),
(2) Date: Jun. 2, 2021

(87) PCT Pub. No.: WO2020/114889
PCT Pub. Date: Jun. 11, 2020

(65) Prior Publication Data
US 2022/0060777 A1  Feb. 24, 2022

(30) Foreign Application Priority Data

Dec. 6, 2018  (EP) ..................................... 18306637

(51) Int. Cl.
*H04N 21/431* (2011.01)
*H04N 21/472* (2011.01)
(Continued)

(52) U.S. Cl.
CPC ..... *H04N 21/4316* (2013.01); *H04N 21/4314* (2013.01); *H04N 21/472* (2013.01);
(Continued)

(58) Field of Classification Search
CPC ........... H04N 21/4316; H04N 21/4314; H04N 21/472; H04N 21/4821; H04N 21/4823; H04N 21/4828; H04N 21/84
(Continued)

(56) References Cited

U.S. PATENT DOCUMENTS

| 6,172,674 B1 | 1/2001 | Etheredge |
| 6,910,191 B2 | 6/2005 | Segerberg et al. |

(Continued)

FOREIGN PATENT DOCUMENTS

| CN | 1234685 A | 11/1999 |
| KR | 100710265 B1 | 4/2007 |
| WO | WO 2011075203 A2 | 6/2011 |

OTHER PUBLICATIONS

English Abstract for CN 1234685, a machine translation for "Performance Guide Display Device and Method".

(Continued)

*Primary Examiner* — Dominic D Saltarelli
(74) *Attorney, Agent, or Firm* — Volpe Koenig

(57) ABSTRACT

An electronic program guide, EPG, comprises a first portion and a second portion. The first portion comprises a list of channels and, for each channel in the list, a list of scheduled audiovisual content. The second portion comprises a selection area or section and a first graphical element representing a time line. The selection section may be used to select scheduled audiovisual content according to a selection criterion. Second graphical elements that represent scheduled audio visual content resulting from the selection are then placed on the first graphical element. The relative position of (Continued)

the second graphical elements on the first graphical element is determined by chronological order.

18 Claims, 4 Drawing Sheets

(51) Int. Cl.
 *H04N 21/482* (2011.01)
 *H04N 21/84* (2011.01)
(52) U.S. Cl.
 CPC ..... *H04N 21/4821* (2013.01); *H04N 21/4823* (2013.01); *H04N 21/4828* (2013.01); *H04N 21/84* (2013.01)
(58) Field of Classification Search
 USPC .......................................................... 725/44
 See application file for complete search history.

(56) References Cited

U.S. PATENT DOCUMENTS

| | | | |
|---|---|---|---|
| 8,381,130 B2 | 2/2013 | Flores et al. | |
| 8,572,649 B1 | 10/2013 | Gossweiler et al. | |
| 8,719,870 B1 | 5/2014 | Davies et al. | |
| 8,972,875 B2 | 3/2015 | Gossweiler et al. | |
| 9,736,545 B2 | 8/2017 | White | |
| 2006/0020966 A1 | 1/2006 | Poslinski | |
| 2008/0126989 A1 | 5/2008 | Flores et al. | |
| 2008/0162430 A1 | 7/2008 | Gossweiler et al. | |
| 2010/0278509 A1* | 11/2010 | Nagano | H04N 21/4325 386/230 |
| 2012/0311637 A1 | 12/2012 | Anthru et al. | |
| 2012/0324508 A1 | 12/2012 | Itoh et al. | |
| 2014/0143812 A1 | 5/2014 | Smith | |
| 2014/0282739 A1 | 9/2014 | Augustine et al. | |
| 2016/0080815 A1* | 3/2016 | Ruffini | H04N 21/41407 725/46 |
| 2016/0173932 A1 | 6/2016 | Jeon et al. | |
| 2017/0318349 A1 | 11/2017 | Wielgosz | |
| 2018/0041814 A1 | 2/2018 | Christie et al. | |
| 2018/0067946 A1* | 3/2018 | Vaisler | G06F 16/48 |
| 2018/0124468 A1 | 5/2018 | Hollingum | |
| 2018/0124470 A1 | 5/2018 | Kim | |
| 2019/0149879 A1* | 5/2019 | Siddiq | G06Q 30/0271 725/14 |

OTHER PUBLICATIONS

English Abstract for KR 100710265 B1, a machine translation for "Display apparatus and method for displaying broadcast information thereof".

\* cited by examiner

ELECTRONIC PROGRAM GUIDE, METHOD FOR AN ELECTRONIC PROGRAM GUIDE, AND CORRESPONDING DEVICE

This application claims the benefit, under 35 U.S.C. § 371 of International Application PCT/EP2019/083000 filed Nov. 28, 2019, which was published in accordance with PCT Article 21(2) on Jun. 11, 2020, in English, and which claims the benefit of European Patent Application No. 18306637.2, filed Dec. 6, 2018.

TECHNICAL FIELD

The present disclosure relates generally to the field of electronic program guides.

BACKGROUND ART

An Electronic Program Guide (or EPG) is a functionality present on most TVs and more generally on devices for receiving television programs. It allows to display in a form of a two-dimensional grid or of a table the programs broadcasted on all the channels of a package or bouquet, usually for the next 7 or 14 days. This grid has time on one axis and channel number on the other axis. A row of the grid is associated with each channel and displays the programs of this channel for the upcoming hours along a time axis.

This presentation of programs according to the time axis is interesting because it allows to view them according to the order of their broadcasting and thus gives the opportunity to the user to know which programs are broadcasted simultaneously in a given period.

Some electronic program guides provide an advanced functionality for selecting among all the programs displayed in the EPG those meeting a specified criterion. The criterion can be selected in a scrolling list comprising a plurality of predetermined criteria: films, sport programs, etc.

In the existing EPGs with this selection facility, the programs issued from this selection are commonly displayed one after the other in a table. Even if the programs are displayed in a chronological order, the main disadvantage of such a presentation is that the distribution of these programs on a time scale is not visible any more. It is then difficult for the user to visualize the distribution of these programs throughout the entire duration of the EPG.

SUMMARY

The present disclosure relates to an electronic program guide for rendering on a display comprising: a first portion (e.g., 10) comprising a list of audiovisual content channels available over a time period, and per audiovisual content channel a list of scheduled audiovisual contents, each of the scheduled audiovisual contents having a scheduled time in the time period, the scheduled time comprising a start time and a duration; a second portion (e.g., 11) comprising a selection section (e.g., 110) for selecting, according a selection criterion, audiovisual content from the scheduled audiovisual contents, and the second portion further comprising a result section (e.g., 111) comprising a result of the selecting; the result comprising a first graphical element (e.g., 112) representing a time line on which at least two of the scheduled audiovisual contents from different audiovisual content channels selected from the scheduled audiovisual contents according to the selection criterion are distributed on the time line according to their scheduled time as chronologically ordered second graphical elements (e.g., 113).

According to an embodiment, the first graphical element (e.g. 112) is a horizontal bar, or a vertical bar.

Advantageously, with such EPG, the generation of the result of the selection along a time axis that for example covers the time period of the EPG (EPG, seven days for an EPG that spans over a week), or that covers the time period of the first portion which may be less than the time period of the EPG (e.g., today, from 19:00 (7 PM) to 22:00 (10 PM)) enables a viewer to easily visualize the distribution of the results over that period. For example, the present principles may enable a viewer to easily visualize a distribution over time of scheduled sports programs (scheduled audiovisual content) occurring on a same channel (audiovisual content channel) or on different channels (audiovisual content channels). According to an embodiment, the viewer may select one or multiple audiovisual content channels in the first portion (e.g., 10), and then enter a selection criterion in the second portion (e.g., 11), such that the graphical element (e.g., 112) will comprise only second graphical elements representing scheduled audiovisual contents that match the selection criterion, from the selected audiovisual content channels selected in the first portion. According to an embodiment, the viewer may use a cursor to move along the time axis, and select one of the second graphical elements (e.g., 113), in order to obtain more detailed information for the program it represents (the selected scheduled audiovisual content it represents), or to instruct recording (for example using a personal video recorder (PVR) function) of the selected program. According to an embodiment, the viewer may select multiple second graphical elements (e.g., 113) and instruct recording of the programs (of the scheduled audiovisual contents) that these selected second graphical elements represent.

According to one or more embodiments, the second portion is positioned lower on the display than the first portion (i.e., the second portion is positioned below/under the first portion related to the top and bottom of the display).

According to one or more embodiments, the second graphical elements have a size proportional to the duration of the scheduled audiovisual content that the second graphical element represents.

According to one or more embodiments, the selection criterion is a according to metadata, for example metadata obtained from EPG data. An example of such metadata is classification of the audiovisual content according to age (adult, child), classification of content according to content type (sport, music, movie), kind of content within content type (e.g., sport content type: kinds are for example football, speed skating, skiing, cycling; for movie content type: kinds are for example thriller, science fiction, horror), or metadata related to actors, producer, etc.).

According to one or more embodiments, the selection criterion is a word input by a user and the result comprises at least one scheduled audiovisual content having associated metadata related to the word.

According to one or more embodiments, the first graphical element 112 is divided into segments, each segment representing a day. The number of segments is for example the same as the number of days covered by the EPG data.

According to one or more embodiments, the segments are of same (equal) size.

According to one or more embodiments, the segments are of decreasing size from a most recent day (i.e., the day of the start date of the EPG), or the current day, to a most distant day (i.e., the day of the last date of the EPG).

According to one or more embodiments, each segment of the first graphical element 112 has a size that is proportional to the number of second graphical elements 113 it comprises.

The present disclosure also relates to a device configured to generate an electronic program guide as defined above.

The present disclosure also relates to a method for an electronic program guide, the method comprising: generating a first portion (e.g., 10) comprising a list of audiovisual content channels available over a time period, and per audiovisual content channel a list of scheduled audiovisual contents. Each of the scheduled audiovisual contents having a scheduled time in the time period. The scheduled time comprising a start time and a duration; generating a second portion (e.g., 11) comprising a selection section (e.g., 110) for selecting, according a selection criterion, audiovisual content from the scheduled audiovisual contents, and a result section (e.g., 111) comprising a result of the selecting; the result comprising a first graphical element (e.g., 112) representing a time line on which at least two of the audiovisual contents from different content channels selected from the scheduled audiovisual contents according to the selection criterion are distributed according to their scheduled time as chronologically ordered second graphical elements.

According to an embodiment of the method for an electronic program guide, the first graphical element is one of: a horizontal bar; a vertical bar.

According to an embodiment of the method for an electronic program guide the second portion is positioned lower on the display than the first portion.

According to an embodiment of the method for an electronic program guide the second graphical elements have a size proportional to a duration of the scheduled audiovisual content that the second graphical element represents.

According to an embodiment of the method for an electronic program guide the selection criterion is according to EPG metadata.

According to an embodiment of the method for an electronic program guide the first graphical element (e.g., 112) is divided into segments (e.g., 116), each segment (e.g., 116) representing a day.

According to an embodiment of the method for an electronic program guide the segments (e.g., 116) are of same size.

According to an embodiment of the method for an electronic program guide the segments (e.g., 116) are of decreasing size from a current day to a most distant day.

According to an embodiment of the method for an electronic program guide the segments have a size proportional to a number of second graphical elements comprised in it.

BRIEF DESCRIPTION OF THE DRAWINGS

The present principles can be better understood with reference to the following description and drawings, given by way of example and not limiting the scope of protection, and in which.

DESCRIPTION OF EMBODIMENTS

In the following description, various aspects of embodiments of the present principles will be described. For the purpose of explanation, specific configurations and details are set forth in order to provide a thorough understanding. However, it will also be apparent to one skilled in the art that the present principles may be practiced without the specific details present herein.

The present disclosure describes an EPG, a method for an EPG, and a device configured to generate an EPG, which may enable to present to a user all the programs (scheduled audiovisual content) he has selected though a selection section along a graphical element representing a time axis (time line), for example covering a whole time period of the EPG (e.g., 7 days), or only covering the time period in the first portion (e.g., 19:00 hrs (7 PM) to 22:00 hrs (10 PM)). This EPG may be generated for display on a display like a TV set or any other device with display capability.

Figure 1:
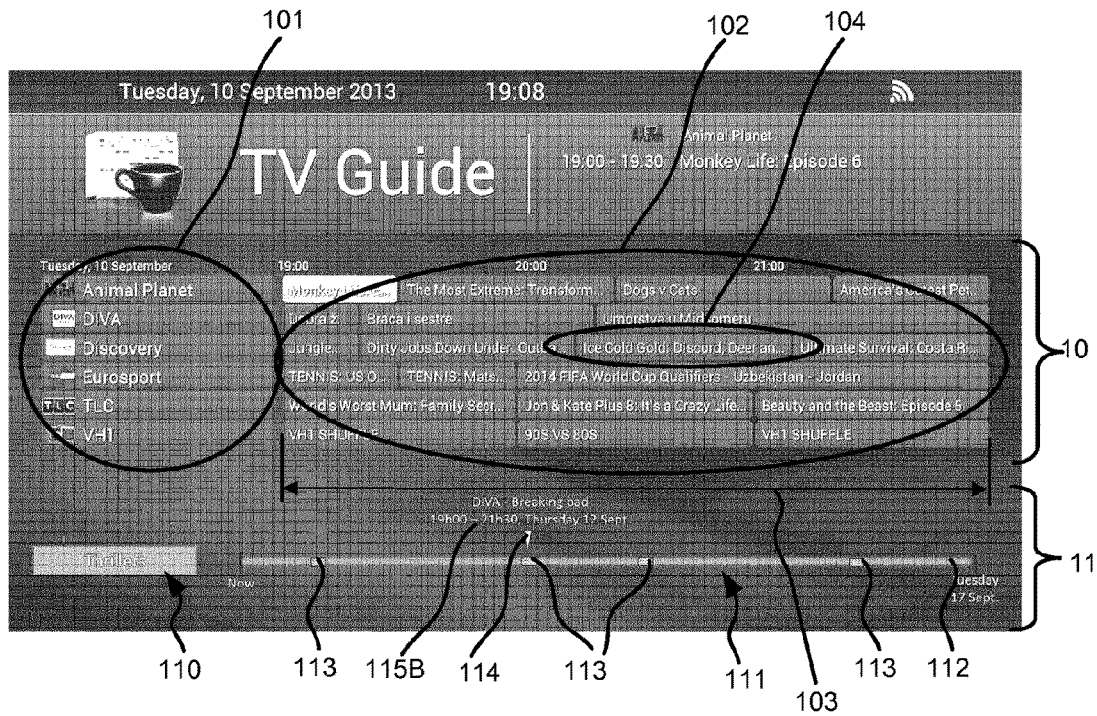
FIG. 1 depicts an EPG according to an embodiment.

FIG. 1 illustrates an example EPG according to a first embodiment.

The exemplary EPG comprises:
  a first portion 10 that comprises a list (table) 102 of audiovisual contents which are scheduled over a time period chosen by the user (here: 19:00 hrs to 22:00 hrs). The time period may be adjustable and may be configured by the user, for example to one hour, one day, or several days, and may be preconfigured. The audiovisual contents are related to a plurality of audiovisual content channels 101, e.g., a list of TV, radio, and/or Internet streaming channels. For each of the audiovisual content channels 101, there is a list of audiovisual contents scheduled in the time period. FIG. 1 shows audiovisual content channels like: Animal Planet, DIVA, Discovery, Eurosport, TLC, and VH1. the scheduled audiovisual contents having a scheduled time in the time period comprising a start time and duration and are chronologically positioned (distributed) on a time line according to start time and duration.
  a second portion 11 which comprises a selection section 110 for selecting, according to a selection criterion, at least one scheduled audiovisual content among the scheduled audiovisual contents and a result section 111 for comprising a result of the selecting.

The result includes the scheduled audiovisual contents meeting the selection criterion. In particular, the result comprises a first graphical element 112 which represents a time line on which the selected scheduled audiovisual contents from a same or different audiovisual content channels are positioned (distributed) according to their scheduled start time as chronologically ordered second graphical elements 113. Each second graphical element on the first graphical element 112 represents a different scheduled audiovisual content, and a second graphical element 113 may represent multiple scheduled audiovisual contents of which start time and/or duration overlap. The result section may be empty when there is no scheduled audiovisual content matching the selection criterion.

Advantageously, the result section may be present in the absence of a selection criterion.

According to an embodiment, a viewer may select one or multiple audiovisual content channels 101 in the first portion 10, and then enter a selection criterion in the second portion 11, such that the first graphical element 112 will comprise only second graphical elements 113 representing scheduled audiovisual contents that match the selection criterion, from the audiovisual content channel or channels selected in the list 101 in the first portion 10. According to an embodiment, the viewer may use a cursor 114 that can be moved along the first graphical element 112, and select one of the second graphical elements 113, in order to obtain more detailed information for the program (the scheduled audiovisual content) it represents, or to instruct recording (for example using a personal video recorder (PVR) function) of the program. According to an embodiment, the viewer may select multiple second graphical elements 113 and instruct recording of the scheduled audiovisual contents that these selected graphical elements represent. This way, the viewer may obtain a recording of audiovisual content, selected by the viewer according to a selection criterion, that are scheduled on the selected audiovisual content channel(s) over a given time period. Advantageously, the audiovisual contents in the recording are recorded one after the other without gaps. According to an embodiment, if scheduled times overlap, for example, if the selection of the viewer results in selection of multiple audiovisual contents from different audiovisual content channels and that are overlapping (that are scheduled at overlapping time, the recordings are still recorded one after the other.

In the first portion 10, the scheduled audiovisual contents 102 of the audiovisual content channels 101 are represented in a grid. For example, the grid may contain the scheduled audiovisual contents for a time period of 2 or 3 upcoming hours, a day, several days, up to the duration of the EPG data (for example, 7 days). The viewer may adjust the duration of the time period as well as the start time of the period, within the limits of availability of EPG data for the period.

In the second portion 11, the result section 111 comprises e.g., a horizontal bar 112, or a vertical bar (i.e., a first graphical element 112). In the case of a vertical bar (not shown), the second portion 11, including the selection section 110 and the result section 111 and the second graphical elements 113, may be positioned beside the first portion 10, for example to the left or to the right of the first portion 10. Once at least one scheduled audiovisual content, possibly from one or more audiovisual content channels selected by the viewer in the first portion, has been selected using the selection section 110, the result section 111 further includes for each scheduled audiovisual content resulting from this selection, a second graphical element 113 placed (distributed) on the horizontal bar (the first graphical element) according to its scheduled start time. According to an embodiment, if the result section includes multiple selected audiovisual contents, the corresponding second graphical elements 113 are distributed on the first graphical element 112 as chronologically ordered second graphical elements 113, ordered (placed, distributed) according to their scheduled start time. A second graphical element 113 represents a program (or a scheduled audiovisual content) of the result of the selection. A second graphical element 113 has for example a geometrical form such as a rectangle, triangle or circle, or arrow or dot. The first graphical element 112 may comprise second graphical elements 113 representing scheduled audiovisual content from a same audiovisual content channel or from different audiovisual content channels, according to the result of the selection and according to a possible selection of audiovisual content channels by the viewer from the list 101; for example, a sports type of audiovisual content scheduled on a first audiovisual content channel, followed by another sports type of audiovisual content scheduled on a second audiovisual content channel.

According to an embodiment, a link between the scheduled audiovisual contents that are represented as second graphical elements 113 placed on the first graphical element 112 in the second portion 11 and the corresponding scheduled audiovisual contents listed in the first portion 10 may be made visible to a viewer by highlighting or emphasizing the corresponding scheduled audiovisual content in the table 102 of the first portion 10. Such feature is particularly advantageous when the time period of the first graphical element 112 in the second portion 11 is the same as the time period of the table 102 in the first portion 10 (e.g., 19:00 to 22:00 in FIG. 1).

The first graphical element 112 (e.g., horizontal bar 112) represents a time axis (time line) covering for instance a part of the time period of the EPG, or a whole time period of the EPG. This time period is for example from 19:00 hrs (7 PM) to 22:00 hrs (10 PM) as shown in FIG. 1, but may be, for example, 1 day, 7 days or more. This time period covers for example a time period over which the plurality of programs (scheduled audiovisual contents) in table 102 are scheduled for broadcast or other delivery. Each second graphical element 113 may be positioned on the first graphical element 112 according to the timestamp (scheduled time, start time, scheduled start time) (i.e. for example date and time of scheduled broadcast/delivery, or start time) of the related program (audiovisual content). According to an embodiment, the size (width in case of the first graphical element 112 being a horizontal bar) of each second graphical element 113 is proportional to the duration of the corresponding program (the corresponding scheduled audiovisual content) that it represents, or, when the time period of the first graphical element 112 in the second portion 11 the same as the time period of the information presented in table 102 of the first portion 10, the same as the size (width) of the corresponding graphical element (e.g., 104) in the table 102 of the first portion 10.

The current date (start time/date of a chosen period) or an indication of the current date (start time/date of a chosen period) ("Now") may be positioned on the left side of the first graphical element 112 (i.e. on one end of the first graphical element 112) and the end date (time) of the end of the time period covered by the first graphical element 112 (for example "Tuesday 17 September") may be positioned on the right side of the first graphical element (i.e. on the other end of the first graphical element 112). Advantageously, the size (width in case of the first graphical element 112 being a horizontal bar) of the first graphical element 112 and its position is aligned with the size and position of the corresponding scheduled audiovisual content (e.g., 104) present in table 102 of the first portion 10, the time period (start date/time and end date/time) covered by table 102 in the first portion 10 is the same as the time period covered by the first graphical element 112 in the second part 11, and the size (e.g. width) of the second graphical elements 113 is the same as the size (width) of the corresponding graphical elements (e.g. 104) in table 102 in the first portion 10. Related to the latter embodiment, and advantageously, when the viewer increases or decreases the time period covered by table 102 in the first portion 10, relatively covered by the first graphical element 112, the time period covered by the first graphical element 112 in the second portion 11, relatively by table 102 in the first portion 10, is adapted accordingly, so as to remain the same; the time periods covered by table 102 in the first portion 10 and covered by the first graphical element 112 in the second portion 11 are the same and are coupled, in the sense that they change jointly when the viewer adjusts the time period.

The result section 111 may further comprise a cursor 114 capable of moving along the first graphical element 112 in order to select a specific graphical element 113. The selection may be performed by positioning the cursor 114 on a graphical element 113 or close to a graphical element 113, preferably not beyond a given threshold distance from a graphical element 113. Upon selection of the graphical element 113 with the cursor 114, additional information related to the scheduled audiovisual content represented by the second graphical element 113 indicated by the cursor 114 may be provided, e.g., as obtained from EPG metadata. For example, upon selection of a second graphical element 113 by moving the cursor 114 to it, an information element 115B appears as associated with that graphical element 113, or as associated with the cursor 114. The information element 115B may comprise information related to the one or more scheduled audiovisual content corresponding to the selected second graphical element 113. The information element 115B may include graphical information, text and/or image information. The information element 115B may be placed in the vicinity of the second graphical element 113 to which the cursor 114 is pointing, for example directly above or below that second graphical element 113 such that the viewer understands the correspondence between the second graphical element 113 pointed to by the cursor 114 and the information element 115B.

Figure 2:
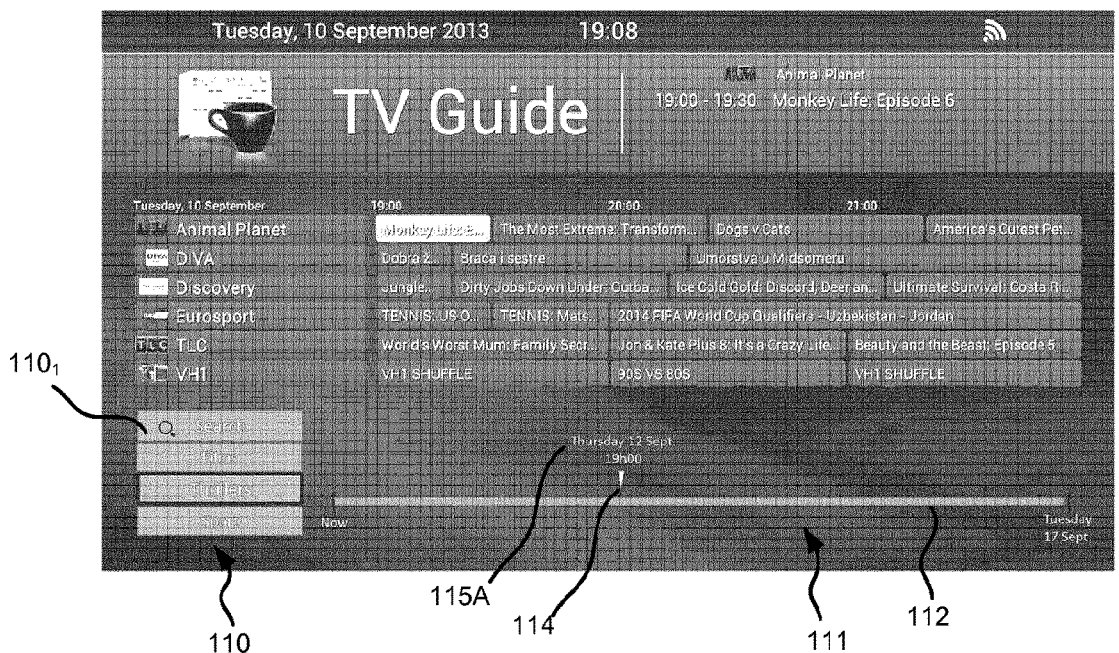
FIG. 2 depicts an EPG of FIG. 1 when the selection criterion is selected in a scrolling list.

In the selection section 110, a selection criterion (e.g., "thrillers" in FIG. 1) may be entered or selected. The selection criterion may be chosen from a scrolling list of predetermined selection criteria as illustrated in FIG. 2. The selection criteria may be extracted from EPG metadata. Examples of selection criteria are: sport programs, films, thrillers, cartoons, most popular films, news and recommended programs. The selection criterion may also be defined by the viewer. In this case, a text input field (or search field) 110$_1$ may be displayed in the selection section and the viewer may enter his selection criterion in this field. The selection criterion may be for example the name of an actor, the name of an audiovisual content, the title of a movie or a part of it. The selection criterion may be searched in text data associated with the audiovisual content as found in EPG metadata. These text data are available in the title/name and/or in the metadata (summary, list of actors, genre . . . ) of the programs, and may be obtained from EPG metadata.

As shown, the second portion 11 may be positioned lower than (below) the first portion 10. The second portion 11 may also be positioned higher than (above) the first portion 10 (not shown). The second portion 11 may also be positioned beside the first portion 10 (not shown), for example to the left, or to the right, of the first portion 10, especially when the first graphical element 112 is a vertical bar (not shown).

The result section 111 may be positioned at the bottom of the display and when the first graphical element 112 is a horizontal bar the width of the first graphical element 112 may be the same as the width 103 of all elements 102 in the first portion 10. Advantageously, the second graphical elements 113 have the same width as the corresponding graphical element in 102. For example, if a second graphical element 113 on first graphical element 112 were to correspond to graphical element 104, that second graphical element 113 would have a same width as the graphical element 104.

In the figures, the selection section 110 is positioned on the left side of the result section 112. The selection section 110 may also be positioned on the right side of result section 112, or above, or below.

As visible in FIG. 1, the information element 115B that may be accessed by positioning of the cursor 114 may include for example a name of the audiovisual content channel carrying the associated scheduled audiovisual content e.g., "DIVA", the name of the program (the name of the scheduled audiovisual content) e.g., "Breaking Bad", the date of the program (the scheduled date of the audiovisual content), e.g., "Thursday 12 September" and/or the time of the program (the scheduled start time and/or end time of the scheduled audiovisual content) e.g., "19h00-21h30".

It can be noted that, before the results (comprising the graphical elements 113) are generated in the result section 111, a timing information element 115A may be generated for showing the position of the cursor 114 on the horizontal bar 112 (on the first graphical element). The timing information element 115A includes a date and/or time pointed to by the cursor on the bar 112, as visible in FIG. 2. The timing information element 115A may also be visible after the results (e.g. comprising the graphical elements 113 corresponding to the selection result) are generated, and/or when no second graphical element 113 is selected by the user/viewer.

The user may move the cursor 114 and/or may select a section in the selection section 110 and/or the result section 111 and/or may choose any program (scheduled audiovisual content) in the grid (table 102) in the first portion 10 by using dedicated keys (left arrow, right arrow, up arrow, down arrow) of a navigation tool (e.g., knobs, buttons, remote control, tactile display or other input means).

A user/viewer may move the cursor 114 along the horizontal bar 112 in order to select a second graphical element 113. The electronic program guide may be configured to indicate, upon selection of a second graphical element 113, an information element 115B comprising information related to the one or more programs corresponding to the selected graphical element. The information element 115B may replace the timing information element 115A as soon as a graphical element is selected.

The information element 115B is displayed in the vicinity of a second graphical element 113 when the user selects the corresponding second graphical element 113. For example, the information element 115B is displayed directly above or under the selected second graphical element 113 so that a user immediately understands the relationship existing between the selected second graphical element 113 and the information element 115B.

According to a particular embodiment, the content of the program grid (table 102) in the first portion 10 of the EPG may not be influenced by positioning action of the cursor 114. The content of the program grid may however be updated to span a period that includes the date/time of the second graphical element 113 pointed to by the cursor 114 when the user presses a dedicated key (validation key, e.g. 'OK' or 'enter' button) of the navigation tool used. According to a particular embodiment, the content of the program grid is updated when the user navigates using the cursor 114. For example, if the time period covered by the first graphical element 112 is greater than the time period covered by table 102, and the cursor is moved to a date/time not covered by the period covered by table 102, the program grid may be updated to show the scheduled audiovisual content around the date/time of the scheduled audiovisual content corresponding to the second graphical element 113 where the cursor 114 points to.

Figure 3:
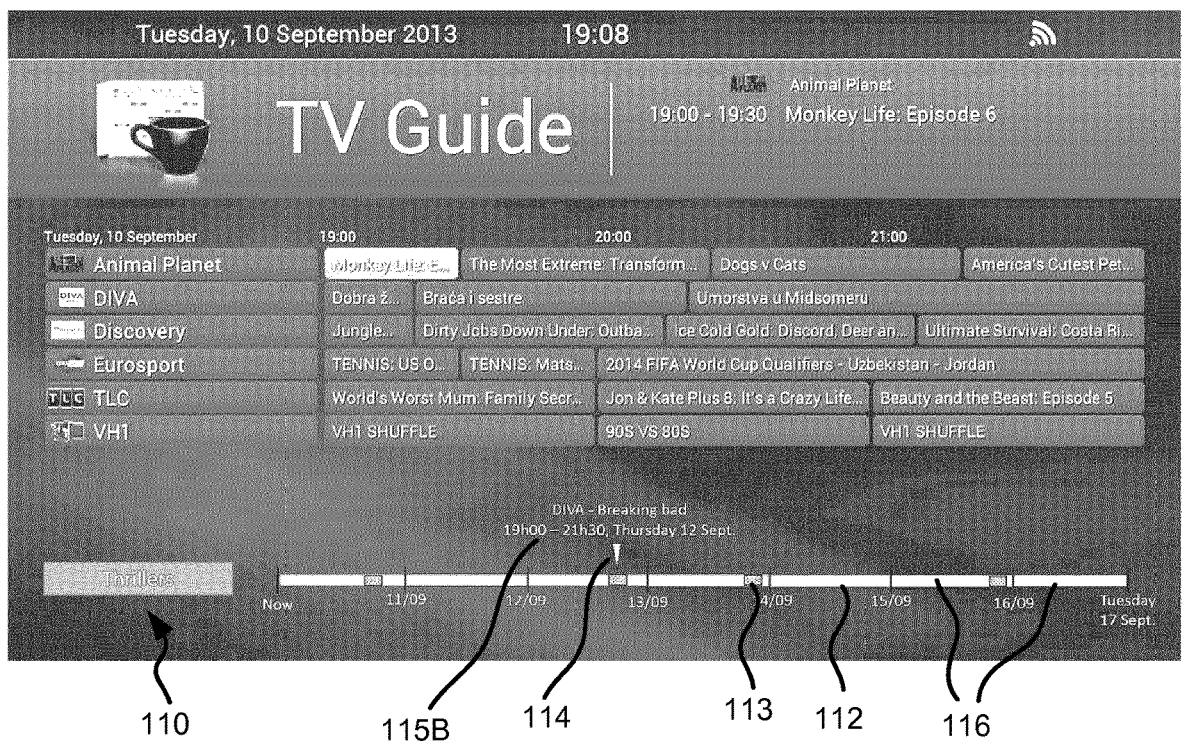
FIG. 3 depicts a first embodiment of an EPG.

According to an embodiment illustrated by FIG. 3, the first graphical element 112 is segmented into a plurality of segments 116, for instance seven segments corresponding to seven up-coming days covered by the EPG data. The segments may be of a same size (i.e. the time scale of the bar is linear). Odd segments (first, third, fifth and seventh segments) may have a first color (e.g. grey) while the even segments (second, fourth and sixth segments) may have a second color (e.g. white) in order to improve their visibility.

According to a different embodiment, the time scale used for the first graphical element 112 may be not linear. In this embodiment, the segments 116 may have a variable size.

Figure 4:
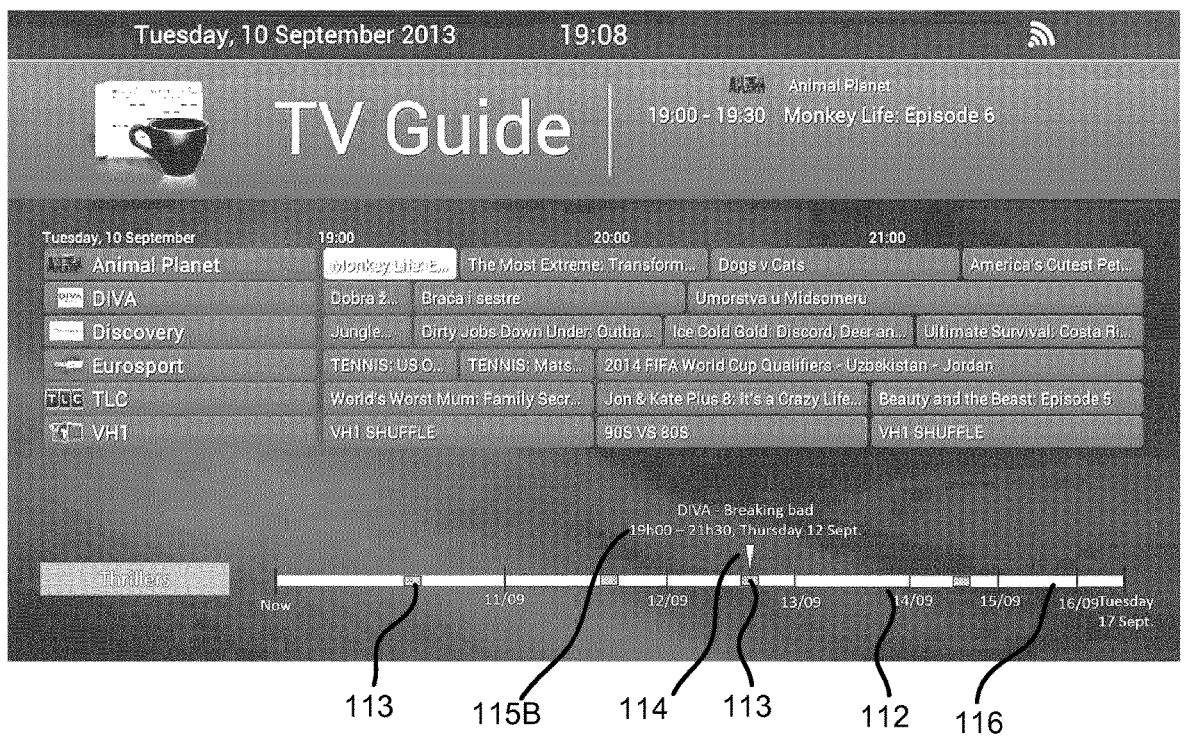
FIG. 4 depicts a second embodiment of an EPG.

According to an embodiment illustrated by FIG. 4, the time scale of the first graphical element 112 is logarithmic. The size (e.g. width) of the segments 116 decreases logarithmically from the first date/time of the EPG to the most distant date/time of the EPG. It enables the user to better see the distribution of the audiovisual contents resulting from the selection operation in the date/time that is closest to current date/time.

Figure 5:
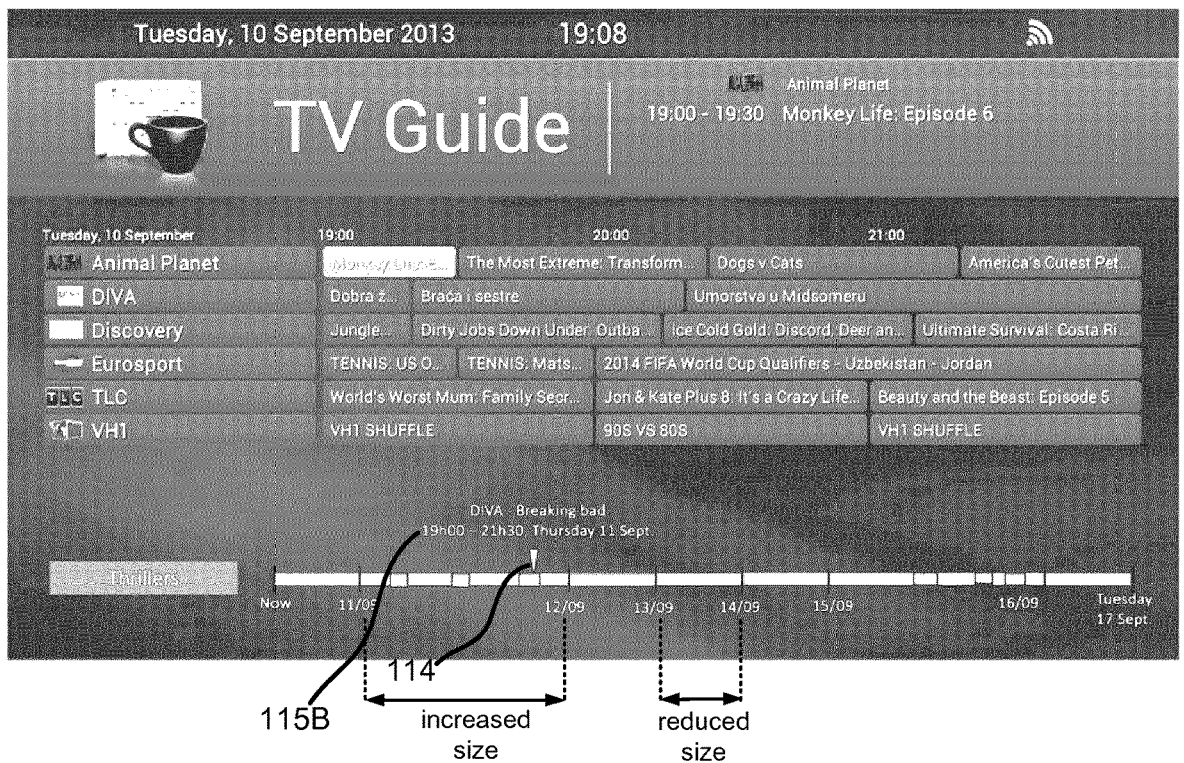
FIG. 5 depicts a third embodiment of an EPG.

According to another embodiment illustrated by FIG. 5, the size of a segment 116 is adapted to the number of second graphical elements 113 comprised in the segment. In this embodiment, a segment 116 with no second graphical element 113 in it has a size smaller than a segment with one or more second graphical elements 113 in it.

Figure 6:
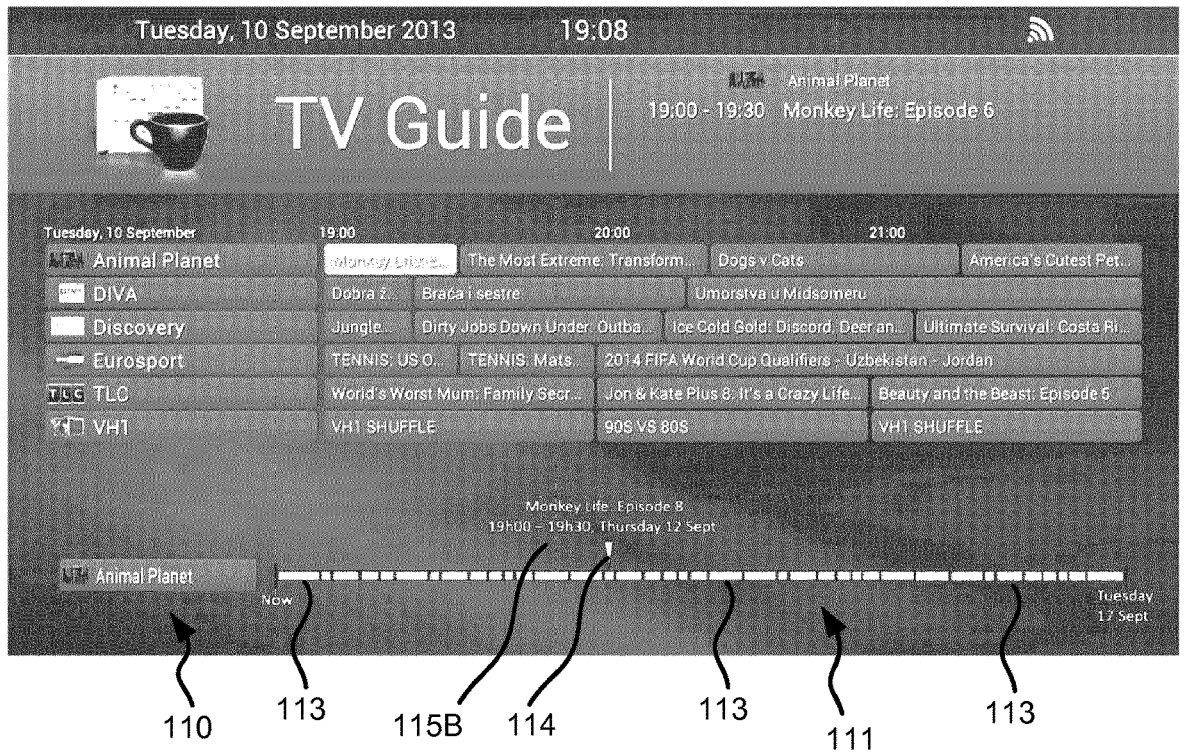
FIG. 6 depicts an example EPG when a specific channel is used as selection criterion.

The selection section 110 is used for selecting scheduled audiovisual content according to different selection criteria and may be used notably for selecting the scheduled audiovisual content of a specific audiovisual content channel as illustrated in FIG. 6. In this figure, the user has selected the specific channel "Animal Planet". This audiovisual content channel is chosen by selecting a dedicated item in the scrolling list of the selection section 110 or by entering the name of the channel in the search field $110_1$. Second graphical elements 113 representing selected (according to the selection criterion) audiovisual content scheduled on the Animal Planet audiovisual content channel for the duration of the time period covered by the first graphical element 112 (e.g., for the upcoming seven days, e.g., from "Now" to September 17 as indicated in FIG. 6) are then displayed on the first graphical element 112. An information element 115B about audiovisual content scheduled on the audiovisual content channel Animal Planet that is represented by second graphical elements 113 can be obtained by positioning the cursor 114 on or in the vicinity of a second graphical element 113. In the example of FIG. 6, the cursor 114 is positioned on the second graphical element 113 associated with an episode of the TV series "Monkey Life" and the information element 115B above this graphical element is: "Monkey Life: Episode 8, 19h00-19h30, Thursday 12 September". This enables to view at once (on a single page) all programs of a dedicated channel.

Figure 7:
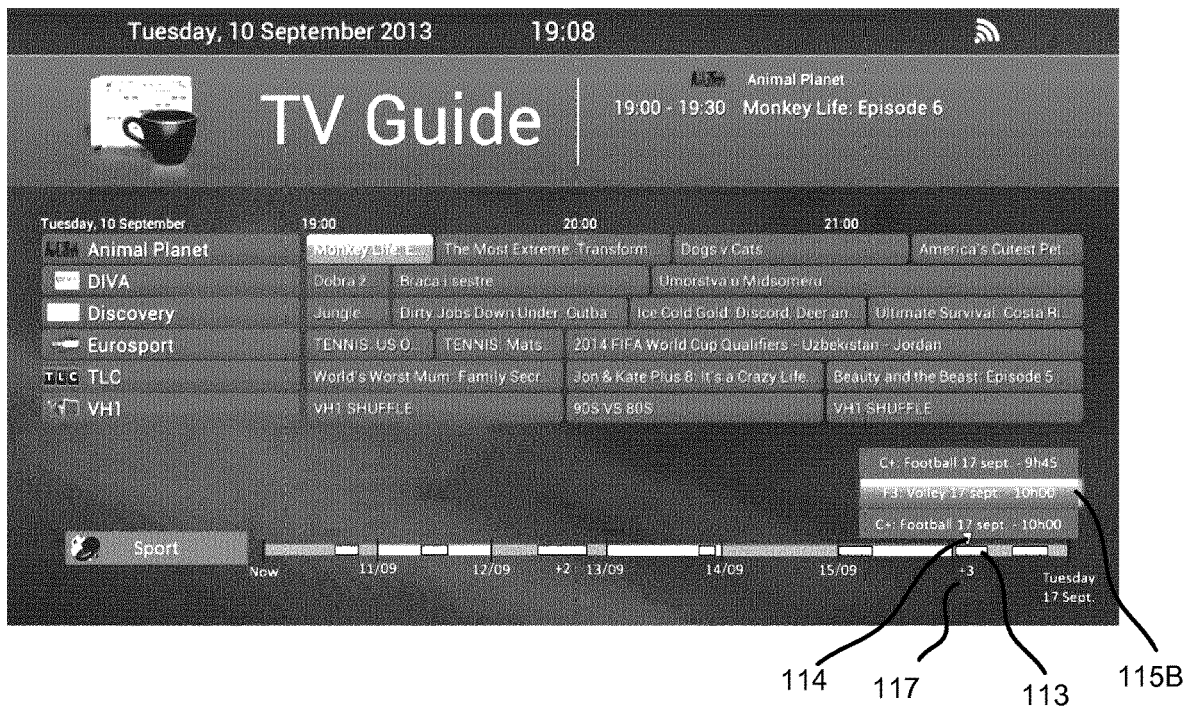
FIG. 7 depicts an example EPG where a selection criterion is applied and when at least two simultaneously scheduled programs are occurring in the result section.

It may occur, as shown in FIG. 7, that two audiovisual contents resulting from the selection operation are scheduled on a same time or have overlapping times/durations. According to an embodiment, the result section 111 is advantageously adapted to ensure readability in such case. According to an embodiment, a single second graphical element 113 is used for representing the overlapping audiovisual contents but the size (height or width) of the information element 115B is increased. For example, if the second graphical element 113 represents two audiovisual contents, the size of the information element 115G is doubled. The size of the information element 115B may thus be proportional to the number of audiovisual contents represented by the second graphical element 113, and may be limited to a given number of audiovisual contents. The size of the information element 115B may also be limited to a predefined maximum size.

According to the embodiment illustrated by FIG. 7, an indication 117 representing the number of overlapping audiovisual contents may be indicated on, above or under the corresponding second graphical element 113. In the example of FIG. 7, three sport programs are scheduled (at least partially) simultaneously on three audiovisual content channels. A single second graphical element 113 is present on first graphical element 112 and the number +3 is indicated under the second graphical element 113 to indicate that the latter represents three programs.

In one or more embodiments illustrated by FIG. 7, the information element 115B is represented as a list of information items, each information item representing one of the scheduled audiovisual contents resulting from the selection. The electronic program guide may further be configured to allow a user to navigate in this list of information items, for example to select an information item and to trigger an operation for the audiovisual content corresponding to the selected information item. The operation may be for example programming a recording of the corresponding audiovisual content, displaying additional information of the corresponding audiovisual content, performing a search based on metadata associated with the corresponding audiovisual content, etc.

Figure 8:
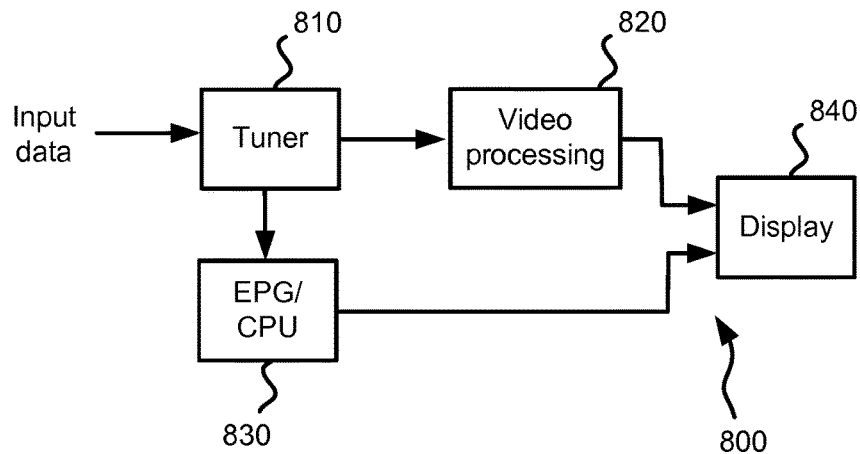
FIG. 8 depicts an example of an apparatus configured to generate an EPG according to the described embodiments.

FIG. 8 shows an example of an apparatus 800 configured to generate an EPG according to any of the described embodiments. The apparatus 800 comprises:
- a tuner 810 for receiving an input signal (e.g., comprising input data in the form of EPG data and possibly audio/video (NV) data); the tuner may demodulate the input signal in order to obtain demodulated data e.g., EPG data, NV data, and may possibly demultiplex the input data if received in multiplexed form;
- a video processing unit 820 for processing any audio/video data output by the tuner;
- a EPG device 830 for processing the EPG data output by the tuner and generating graphical interfaces as defined above; The device 830 may be a processing unit or processor; and
- a display device 840 for displaying the video data processed by the video processing unit 820 and the graphical interfaces generated by the EPG device 830.

The above depicted architecture is a mere example architecture. Other architectures may be suitable for implementing an apparatus 800. For example,
- the display device 840 may not be part of the apparatus 800, in which case device 800 may comprise an interface for connection of video processing unit 820 to an external display device. The apparatus 800 may for example be a Set Top Box device.
- the tuner 810 may be not part of apparatus 800, for example, when apparatus 800 is an Internet device, tuner 810 may be replaced by a wired or wireless LAN or WLAN interface for connection to a LAN or WLAN, or for example, if apparatus 800 is a mobile device, tuner 810 may be replaced by a 3G/4G/5G wireless network interface for connection to a wireless mobile device network.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

A further embodiment is a computer readable storage medium having a set of instructions stored therein, the set of instructions being configured to, when being loaded by a computer, a processor, or a programmable hardware component, to cause the computer, the processor, or respectively the programmable hardware component or more generally the host device to implement one of the above methods. In some embodiments, the computer readable storage medium is non-transitory.

Herein, some embodiments are also intended to cover computer readable storage media, e.g., digital data storage media, which are machine or computer readable and encode machine-executable or computer-executable programs of instructions where said instructions perform some or all of the steps of methods described herein.

The computer readable storage media may be, e.g., digital memories, magnetic storage media such as magnetic disks and magnetic tapes, hard drives, or optically readable digital data storage media.

The embodiments are also intended to cover computers programmed to perform said steps of methods described herein or (field) programmable logic arrays ((F)PLAs) or (field) programmable gate arrays ((F)PGAs), programmed to perform said steps of the above-described methods.

It should further be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although some embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An electronic program guide, EPG, for rendering on a display, wherein the EPG comprises:
a first portion comprising a list of audiovisual content channels, and per audiovisual content channel a list of scheduled audiovisual contents available over a time period, each of the scheduled audiovisual contents having a scheduled time in the time period, the scheduled time comprising a start time and a duration, each of the audiovisual content channels in the list of audiovisual content channels being selectable according to a first selection;
a second portion comprising a selection section for selecting, according to a second selection comprising a selection criterion comprising a content type classification according to metadata obtained from EPG data, audiovisual content from the scheduled audiovisual contents, and the second portion further comprising a result section comprising a result of the first selection and the second selection; and
the result of the first selection and the second selection comprising a first graphical element representing a time line on which at least two of the scheduled audiovisual contents selected according to the second selection from different audiovisual content channels selected according to the first selection are distributed on the time line according to their scheduled time as chronologically ordered second graphical elements.

2. The electronic program guide according to claim 1, wherein the first graphical element is one of: a horizontal bar; a vertical bar.

3. The electronic program guide according to claim 1, wherein the second portion is positioned lower on the display than the first portion.

4. The electronic program guide according to claim 1, wherein the second graphical elements have a size proportional to a duration of the scheduled audiovisual contents that the second graphical elements represent.

5. The electronic program guide according to claim 1, wherein the first graphical element is divided into segments, each segment representing a day.

6. The electronic program guide according to claim 5, wherein the segments are of same size.

7. The electronic program guide according to claim 5, wherein the segments are of decreasing size from a current day to a most distant day.

8. The electronic program guide according to claim 5, wherein the segments have a size proportional to a number of second graphical elements comprised in it.

9. A method for an electronic program guide, the method comprising:
generating a first portion comprising a list of audiovisual content channels, and per audiovisual content channel a list of scheduled audiovisual contents available over a time period, each of the scheduled audiovisual contents having a scheduled time in the time period, the scheduled time comprising a start time and a duration, each of the audiovisual content channels in the list of audiovisual content channels being selectable according to a first selection;
generating a second portion comprising a selection section for selecting, according to a second selection comprising a selection criterion comprising a content type classification according to metadata obtained from EPG data, audiovisual content from the scheduled audiovisual contents, and a result section comprising a result of the first selection and the second selection; and
the result of the first selection and the second selection comprising a first graphical element representing a time line on which at least two of the audiovisual contents selected according to the second selection from different content channels selected according to the first selection are distributed on the time line according to their scheduled time as chronologically ordered second graphical elements.

10. The method according to claim 9, wherein the first graphical element is one of: a horizontal bar; a vertical bar.

11. The method according to claim 9, wherein the second portion is positioned lower on a display than the first portion.

12. The method according to claim 9, wherein the second graphical elements have a size proportional to a duration of the scheduled audiovisual contents that the second graphical elements represent.

13. The method according to claim 9, wherein the first graphical element is divided into segments, each segment representing a day.

14. The method according to claim 13, wherein the segments are of same size.

15. The method according to claim 13, wherein the segments are of decreasing size from a current day to a most distant day.

16. The method according to claim 13, wherein the segments have a size proportional to a number of second graphical elements comprised in it.

17. A device configured to generate an electronic program guide according to claim 9.

18. A computer program product stored on a non-transitory computer readable medium and comprising program code instructions executable by a processor for implementing the steps of a method according to claim 9.

* * * * *